United States Patent [19]
Grell

[11] Patent Number: 5,418,074
[45] Date of Patent: May 23, 1995

[54] COLD STRIP FOR MANUFACTURING DEEP-DRAWN CASE-HARDENED PRECISION COMPONENTS, PARTICULARLY ROLLING BEARING AND ENGINE COMPONENTS

[75] Inventor: Karl-Ludwig Grell, Aurachtal, Germany

[73] Assignee: Ina Walzlager Schaeffler KG, Germany

[21] Appl. No.: 964,657

[22] Filed: Oct. 22, 1992

[30] Foreign Application Priority Data

Nov. 12, 1991 [DE] Germany .......... 41 37 118.6

[51] Int. Cl.⁶ .......... B32B 15/18
[52] U.S. Cl. .......... 428/677; 428/683
[58] Field of Search .......... 428/683, 677, 610; 148/210, 220, 529

[56] References Cited

U.S. PATENT DOCUMENTS

| | | | |
|---|---|---|---|
| 307,582 | 11/1884 | Pedder | 428/683 |
| 642,158 | 1/1900 | Russell | 428/683 |
| 1,869,208 | 7/1932 | McMillen | 428/683 |
| 2,342,104 | 2/1944 | Holt | 428/683 |
| 2,387,919 | 10/1945 | Lose | 428/683 |
| 2,438,759 | 3/1948 | Liebowitz | 428/683 |
| 3,224,088 | 12/1965 | McNelly | 428/683 |
| 3,734,582 | 5/1973 | Beauchet | 384/492 |
| 4,013,487 | 3/1977 | Ramquist | 428/658 |
| 4,858,294 | 8/1989 | Hollox | 148/210 |
| 4,904,094 | 2/1990 | Furumura et al. | 384/492 |
| 5,077,003 | 12/1991 | Muraoka | 384/492 |
| 5,137,375 | 11/1992 | Murakami et al. | 384/450 |

FOREIGN PATENT DOCUMENTS

| | | | |
|---|---|---|---|
| 2106939 | 2/1975 | France | 428/683 |
| 2150151A | 6/1985 | United Kingdom | 428/683 |
| 1687634 | 10/1991 | U.S.S.R. | 148/220 |

*Primary Examiner*—John Zimmerman
*Attorney, Agent, or Firm*—Bierman and Muserlian

[57] ABSTRACT

A cold strip for manufacturing deep-drawn, case-hardened precision components, particularly rolling bearing and engine components, in which a core material (2) is roll clad at least on one side with a cladding material (3), characterized in that the core material (2) is a low-carbon cold or hot steel strip and the cladding material (3) is a cold or hot strip with increased carbon content, the core (2) and the cladding material (3) having different physical and chemical properties which complement each other, particularly with regard to deep-drawability, hardenability, constant reverse-bend fatigue strength and wear resistance.

3 Claims, 1 Drawing Sheet

Fig. 1
Fig. 2
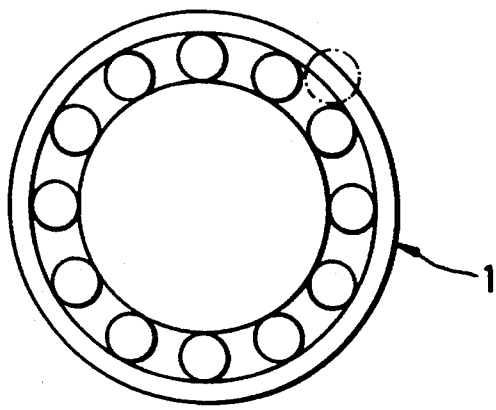
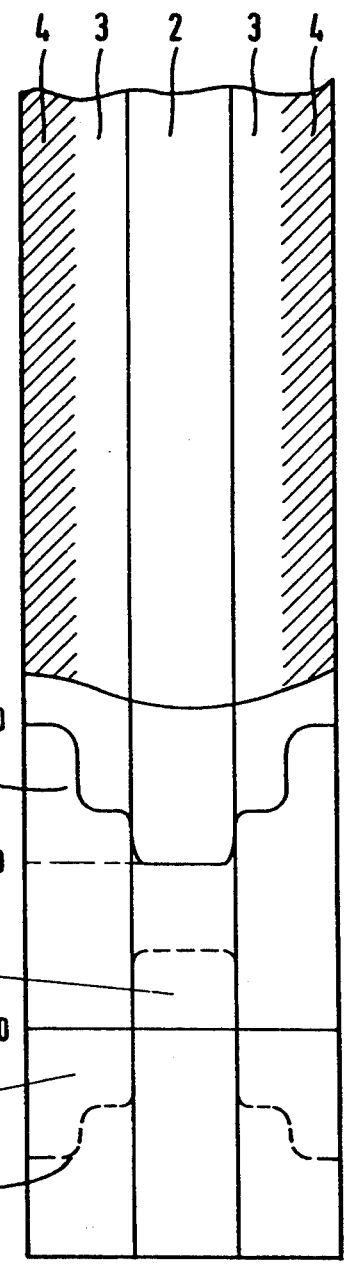
Fig. 3
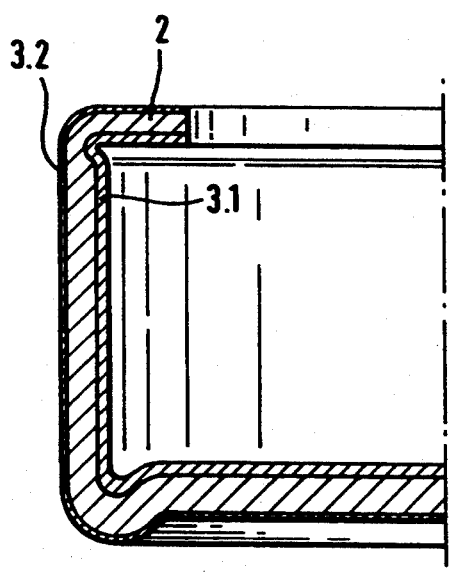

COLD STRIP FOR MANUFACTURING DEEP-DRAWN CASE-HARDENED PRECISION COMPONENTS, PARTICULARLY ROLLING BEARING AND ENGINE COMPONENTS

STATE OF THE ART

High requirements are made on the deep-drawability and hardenability of materials for drawn, in particular for deep-drawn precision components. Thus, the cold strip should possess low tensile and yield strengths, a high rupture elongation and a favorable coefficient of cold forming and, as far as possible, it should not tend to the formation of ears. At the same time, the material must possess adequate hardenability so that the required hardness and favorable dimensional behavior are obtained when the component is case-hardened. A constant and uniform change in dimension during case-hardening is a further criterion for the material.

As a rule, however, good deep-drawing properties and good hardenability are opposed requirements when made of common commercial steel materials or cold strips. Deep-drawable steels are therefore usually employed which, for hardening, have to be subjected to sophisticated procedures (case-hardening). These hardening procedures have particularly the disadvantage of a very long sojourn time in the case-hardening furnace, and normally finishing treatments are also required.

If, additionally, a rust-protected outer surface is required, a further surface treatment, for example the deposition of a galvanic coating becomes necessary. It is already known to clad cold strip on one or both sides with a coating material. This cladding, as a rule of tombac, however, serves to improve the sliding properties of the cold strip in the deep-drawing mould, as a protection against rust, or for the manufacturing of coins. In other uses, cold strips are clad on one side, for instance with aluminum, to improve the corrosion resistance of the finished component. In none of these cases does the cladding of the cold strip change the properties of the material with regard to hardenability.

OBJECTS OF THE INVENTION

It is an object of the invention to provide a cold strip for manufacturing deep-drawn components which is optimized with regard to deep-drawability and surface hardenability as well as with regard to constant reverse-bend fatigue strength and wear resistance.

This and other objects and advantages of the invention will become obvious from the following detailed description.

THE INVENTION

The core material of the invention is a low-carbon strip and the cladding material is a cold or hot strip with increased carbon content, so that the core and the cladding material have different physical and chemical properties which complement each other, particularly with regard to deep-drawability, hardenability, and consequently, also with regard to constant reverse-bend fatigue strength and wear resistance.

By cladding a steel strip with a strip having different properties as compared to the core material, a strip is obtained whose specific properties such as deep-drawability or the like are not, as would be supposed, determined by a summation of the individual layers of material. As a matter of fact, the materials rather influence each other by a synergistic effect so that, particularly the forming properties of the clad cold strip are of advantage for the required manufacturing conditions.

In a preferred embodiment of the cold strip of the invention, which can be used especially for manufacturing highly loaded rolling bearing and engine components, the core material is a steel with good deep-drawability, while the cladding material has a high hardenability. After deep-drawing the cold strip into the final component, this can be subjected to a heat treatment or a hardening process with the hardness penetration depth being predetermined by the layer thickness of the cladding material. In an advantageous manner, a very rapid diffusion of carbon takes place from the region of the material rich in carbon into the low-carbon region so that a soft transition hardness zone (carbon transition zone) is obtained similar to case hardening. At the same time, a generally more favorable residual stress characteristic is obtained. Components made of such a cold strip therefore meet the highest requirements of a defined hardness penetration depth coupled with ductility of the core and an extremely short heat treatment time, i.e., some seconds, if suitable procedures such as inductive heating or laser hardening techniques are used.

The layer thickness of the cladding material of the cold strip of the invention is preferably b 3 to 20% of the total thickness of the finished cold strip. Particularly suitable core materials for such a cold strip are steels with a C-content of 0.05 to 0.25%. Steels with a C-content of 0.15 to 1.10% are preferably used as cladding materials, while the total content of alloying additions such as Mn, Cr, Ni, Mo can be up to 10%.

In further embodiments of the invention, the cladding material possesses special properties with regard to the joining of the component to other components or to loading by environmental influences. One of these properties is a good weldability of the cladding material or the component, that is to say, only by the cladding with a weldable material do such components acquire good welding properties.

In still other embodiments of the invention, the cold strip is additionally provided with a further cladding layer which improves the sliding properties for deep-drawing and/or increases corrosion resistance. For this purpose, tombac is particularly suitable. In a final calibration step of the deep-drawing procedure, this protective layer can be partially removed from the deep-drawn component so that this layer remains only on intended parts of the finished component. Due to its heat resistance, the copper contained in the tombac remains intact even after the heat treatment.

Since this tombac or copper layer prevents carburization on the outside, it is possible, for instance, to crimp a drawn rim without cost-intensive partial inductive heating, which is particularly advantageous from the economical point of view. This non-ferrous metal layer also replaces the otherwise necessary rust protection by galvanically deposited layers.

BRIEF DESCRIPTION OF THE DRAWINGS

FIG. 1 is a rolling bearing ring made of a cold strip of the invention,

FIG. 2 is an enlarged representation in a cross-sectional view of the material showing residual stress and hardness curves obtained in the encircled region of FIG. 1, and FIG. 3 is a rolling bearing bush made of cold steel strip clad on both sides.

DESCRIPTION OF THE PREFERRED EMBODIMENTS

FIG. 1 shows a rolling bearing ring 1 of which high requirements are made in respect of edge hardness and ductility of the component. The layer build-up of the component can be seen in the enlarged detail shown in FIG. 2. The core material 2 is CK 15 and it is clad on both sides with the cladding material 3 which is 16 MnCr 5. The schematically represented hardness and residual stress curves, 5 and 6 respectively, are obtained after case hardening 4. By the cladding of the core material 2, a favorable, stepped hardness curve and a similarly characterized residual stress curve are obtained so that this composite material system provides the component at the same time with increased ductility.

FIG. 3 shows a rolling bearing bush made of cold steel strip clad on both sides. The core material 2 used is St 4. The side carrying the running face is provided with a cladding 3.1 of CK 67 as the hard layer, and the opposite side is provided with a cladding 3.2 of tombac. Optionally, instead of the cladding CK 67, the core material can also be case-hardened without a cladding. In this case, the tombac cladding 3.2 prevents carburization of the side opposite the running face and this makes it possible to cold-crimp the drawn rim inexpensively without inductive heating. The otherwise necessary rust protection by galvanically deposited layers of zinc and yellow chromated coatings can also be dispensed with due to the copper alloy used, i.e., the proposed solution also contributes to minimizing environmental load.

CK15 is a steel according to DIN 17 210, comparable with US Standard SAE 1015. Its typical composition is: 0.12 to 0.1% C, a maximum of 0.40% Si, 0.30 to 0.60% Mn, a max. of 0.035% each of P and S, 0.8 to 1.10% Cr, and the rest iron.

16MnCr5 is likewise a case hardening steel acc. to DIN 17 210, comparable with SAE 5115. Its typical composition is: 0.14 to 0.19% C, a max. of 0.40% Si, 1.0 to 1.30% Mn, a max. 0.035% each of P and S, 0.8 to 1.10% Cr, and the rest iron.

St4 is a deep drawing steel according to DIN 1623 with a typical composition of, for example, a max. of 0.10% C, a max. of 0.40% Si, 0.20 to 0.60% Mn, a max. of 0.035% each of P and S, a max. of 0.08% Al, and the rest iron. Comparable with US Standard SAE 1008.

CK67 is a tempering steel defined in DIN 17 222 "Cold rolled steel strips for springs". It is comparable with US Standard SAE 1065 and SAE 1070. It contains 0.65 to 0.72% C, 0.15 to 0.35% Si, 0.60 to 0.90% Mn, a max. of 0.035% each of P and S, and the rest iron.

Various modifications of the cold steel strip of the invention may be made without departing from the spirit or scope thereof and it is to be understood that the invention is intended to be limited only as defined in the appended claims.

What I claim is:

1. A cold rolled strip for manufacturing deep-drawn, case-hardened precision components in which a core material (2) with a high, deep-draw ability is roll clad at least on one side with a cladding material (3) with a good hardenability and high wear-resistance, characterized in that the core material (2) is a low-carbon cold rolled or hot rolled steel strip with a carbon content of 0.05 to 0.25% and the cladding material (3) is a cold rolled or hot rolled strip with a carbon content of 0.15 to 1.10% greater than that of the core material, the core (2) and the cladding material (3) have different physical and chemical properties which complement each other with regard to deep-drawability, hardenability, constant reverse-bend fatigue strength and wear resistance and the cladding material thickness being 3 to 20% of the total thickness of the cold rolled strip, the cladding material (3) on one side of the core material (2) is a hardenable steel and the cladding material (3) on the other side of the core material (2) is a copper-containing anti-rust alloy.

2. A cold rolled strip of claim 1 wherein the copper-containing alloy is tombac.

3. A cold rolled strip of claim 1 wherein the core material (2) is clad on one side with a cladding material (3) which is a 0.05 to 0.20 mm thick layer of copper alloy.

* * * * *